United States Patent
Bauer et al.

(10) Patent No.: US 11,536,318 B1
(45) Date of Patent: Dec. 27, 2022

(54) BEARING INNER RING WITH INTEGRAL MOUNTING MEANS

(71) Applicants: AKTIEBOLAGET SKF, Gothenburg (SE); PEER Bearing Company, Waukegan, IL (US)

(72) Inventors: Andrew Michael Bauer, Salem, WI (US); Jordan Eric Gutowski, Vernon Hills, IL (US); Trenton Alan Midyett, Waukegan, IL (US); Joseph Anthony D'Andrea, Oak Creek, WI (US)

(73) Assignees: AKTIEBOLAGET SKF, Gothenburg (SE); PEER BEARING COMPANY, Waukegan, IL (US)

( * ) Notice: Subject to any disclaimer, the term of this patent is extended or adjusted under 35 U.S.C. 154(b) by 0 days.

(21) Appl. No.: 17/479,477

(22) Filed: Sep. 20, 2021

(51) Int. Cl.
  *F16C 35/063* (2006.01)
  *F16C 19/06* (2006.01)
  *F16C 33/58* (2006.01)
  *F16C 23/08* (2006.01)

(52) U.S. Cl.
  CPC ............ *F16C 35/063* (2013.01); *F16C 19/06* (2013.01); *F16C 33/583* (2013.01); *F16C 23/08* (2013.01)

(58) Field of Classification Search
  CPC ........ F16C 19/06; F16C 23/08; F16C 23/084; F16C 33/583; F16C 35/063; F16C 2226/10
  See application file for complete search history.

(56) References Cited

U.S. PATENT DOCUMENTS

| | | | |
|---|---|---|---|
| 4,537,519 A * | 8/1985 | LaRou | F16C 23/084 384/537 |
| 4,728,202 A | 3/1988 | LaRou | |
| 5,417,500 A | 5/1995 | Martinie | |
| 5,863,137 A * | 1/1999 | Johnson | F16C 35/063 384/537 |
| 6,336,748 B2 | 1/2002 | Johnson et al. | |
| 6,840,679 B2 * | 1/2005 | Lenick | F16C 35/063 384/537 |
| RE39,027 E | 3/2006 | Johnson et al. | |
| 7,300,210 B2 | 11/2007 | Johnson et al. | |
| 7,306,375 B2 * | 12/2007 | Lenick | F16C 35/063 384/537 |
| 9,618,042 B2 | 4/2017 | Kamath et al. | |

* cited by examiner

*Primary Examiner* — Phillip A Johnson
(74) *Attorney, Agent, or Firm* — J-TEK Law PLLC; Scott T. Wakeman; Mark A. Ussai (57) ABSTRACT

An inner ring assembly for a bearing includes a bearing annular body disposable about the shaft and having a bearing inner race and a plurality of slotted openings defining a plurality of arcuate mounting tabs, the slotted openings each having a curved inner end and each tab including a substantial recess to reduce stress concentration. An annular locking collar is disposed about and clamps the mounting tabs against the outer surface of the shaft to retain the inner ring. The collar is retained on the ring body by a retainer projection(s) extending outwardly from the mounting tabs and engaging with the collar or a retainer member projecting inwardly from the collar and engaging with one of the mounting tabs. The collar has a gap and a flat outer surface section spaced from the gap to increase the dynamic balance and the flexibility of the collar.

20 Claims, 13 Drawing Sheets

BEARING INNER RING WITH INTEGRAL MOUNTING MEANS

BACKGROUND OF THE INVENTION

The present invention relates to bearings, and more particularly to bearing inner rings for rolling element bearings.

Rolling element bearings basically include an inner ring mounted on a shaft or inner member, an outer ring disposed within a housing or outer member, and a plurality of rolling elements disposed between and rotatably coupling the inner and outer rings. In general, the inner ring is mounted on the shaft by an interference or press fit, which requires relatively precise machining of the shaft outer surface for proper installation. However, in applications where it is desired to avoid such shaft machining, for example to reduce costs, the inner ring may be installed on the shaft by an integral mounting means, i.e., a mounting mechanism provided with the bearing. Typically, such integral mounting means include mounting fingers or tabs formed on the bearing inner ring and a collar for clamping the fingers/tabs onto the shaft outer surface.

SUMMARY OF THE INVENTION

In one aspect, the present invention is an inner ring assembly for a bearing, the bearing rotatably coupling a shaft with an outer member, the shaft being rotatable about a central axis. The inner ring assembly comprises a bearing annular body disposable about the shaft and having a centerline, opposing first and second axial ends, an outer circumferential surface, and an annular groove extending radially inwardly from the outer surface and providing a bearing inner race. A plurality of slotted openings extend axially inwardly from the first axial end and are spaced circumferentially about the centerline so as to define a plurality of arcuate mounting tabs. Each mounting tab has an inner end integral with a remainder of the annular body and an opposing, free outer end. An annular locking collar is disposed about the plurality of mounting tabs and is configured to clamp the tabs against the outer surface of the shaft so as to retain the inner ring radially and axially with respect to the shaft central axis. The collar is retained on the ring annular body when the inner ring is separate from the shaft by a retainer projection extending radially outwardly from the outer end of one of the mounting tabs and engaging with the collar and/or a retainer member movably coupled with and projecting radially inwardly from the collar and engaging with one of the mounting tabs.

In another aspect, the present invention is again an inner ring assembly for a bearing, the bearing rotatably coupling a shaft with an outer member, the shaft being rotatable about a central axis. The inner ring assembly comprises an annular body disposable about the shaft and having a centerline, opposing first and second axial ends, an outer circumferential surface and an annular groove extending inwardly from the outer surface and providing a bearing inner race. A plurality of slotted openings extend axially inwardly from the first axial end and are spaced circumferentially about the centerline so as to define a plurality of arcuate mounting tabs. Each mounting tab has an inner end integral with a remainder of the annular body and an opposing, free outer end. A locking collar includes an annular body disposed about the plurality of mounting tabs, the annular body having an inner circumferential surface with an inside diameter, an outer circumferential surface and a gap defining first and second spaced apart circumferential ends. A threaded rod extends through the first and second circumferential ends such that rotation of the rod in a first angular direction displaces the first and second ends generally toward each other to reduce the body inside diameter and compress the plurality of mounting tabs into engagement with the shaft. The body outer circumferential surface has a flat surface section with a center spaced about one hundred eighty degrees (180°) about the centerline from the gap so as to increase the dynamic balance of the collar about the shaft central axis.

In a further aspect, the present invention is once again an inner ring assembly for a bearing, the bearing rotatably coupling a shaft with an outer member, the shaft being rotatable about a central axis. The inner ring assembly comprises an annular body disposable about the shaft and having a centerline, opposing first and second axial ends, an outer circumferential surface, an annular groove extending inwardly from the outer surface and providing a bearing inner race. A plurality of slotted openings extend axially inwardly from the first axial end and are spaced circumferentially about the centerline so as to define a plurality of arcuate mounting tabs, each slotted opening being partially bounded by a curved inner end surface. Each mounting tab has an inner axial end integral with a remainder of the annular body, a free, outer axial end and an outer circumferential surface. The outer circumferential surface of each tab has a radiused section at the tab inner end, a cylindrical section extending axially inwardly from the tab outer end and an angled section extending between the radiused surface section and the cylindrical surface section and defining a recess. Further, an annular locking collar is disposed about the plurality of mounting tabs and is configured to clamp the tabs against the outer surface of the shaft so as to retain the inner ring radially and axially with respect to the shaft central axis.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Figure 1:
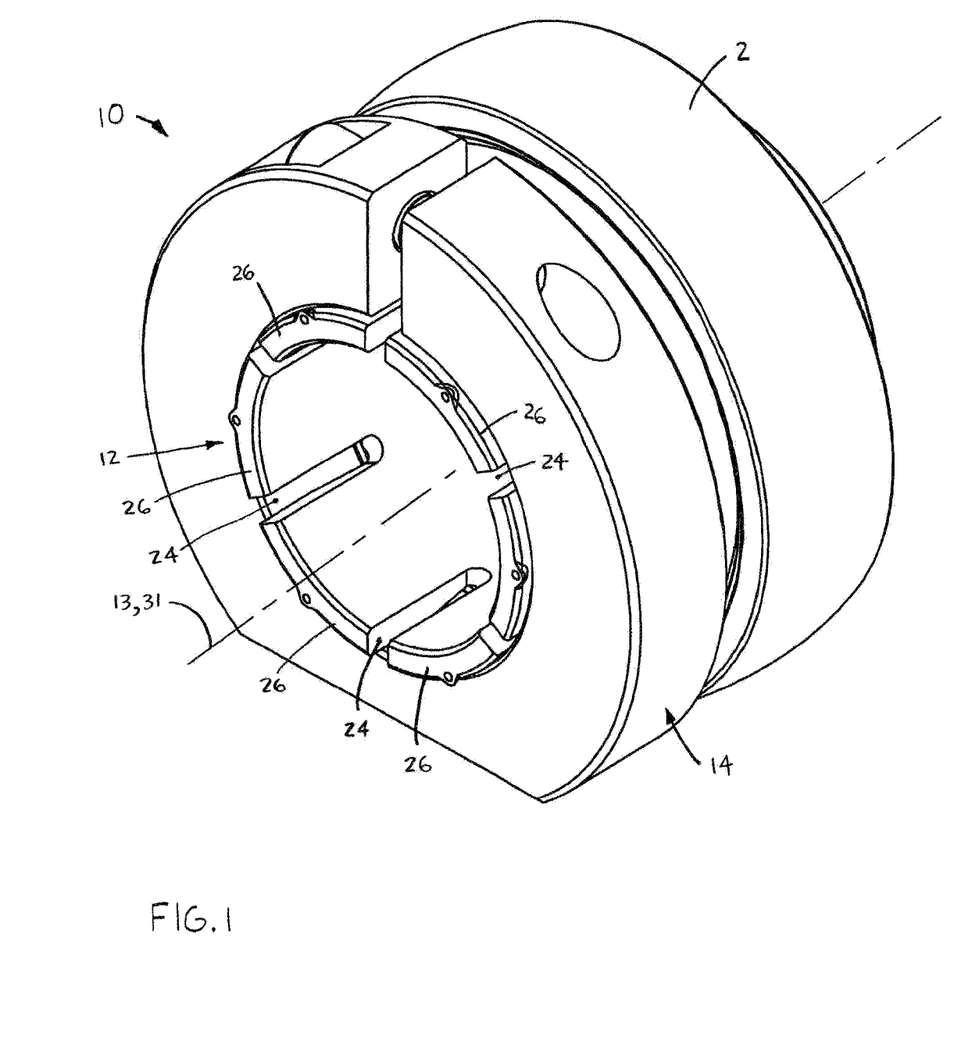
FIG. 1 is a perspective view of a bearing including an inner ring assembly according to the present invention.
Figure 2:
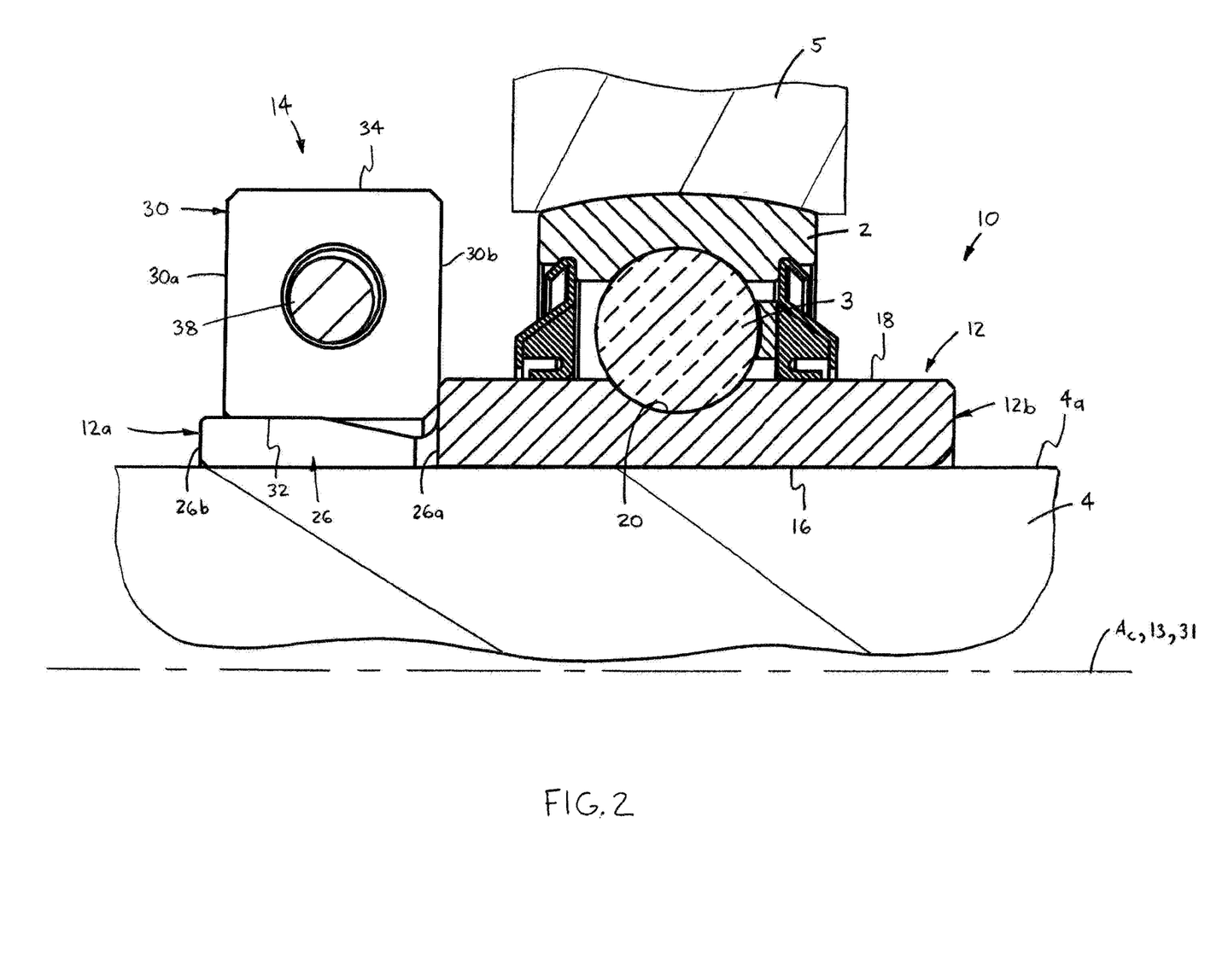
FIG. 2 is a broken-away, upper axial cross-sectional view of a bearing with the present inner ring assembly, shown installed on a shaft and within an outer member.

Referring now to the drawings in detail, wherein like numbers are used to indicate like elements throughout, there is shown in FIGS. 1-16 an inner ring assembly 10 for a bearing 1, which preferably includes an outer ring 2 disposed about the inner ring 10 and a plurality of rolling elements 3 disposed between the inner ring assembly 10 and the outer ring 2 as shown in FIG. 2. The bearing 1 rotatably couples a shaft 4 with an outer member 5, such as a housing, the shaft 4 being rotatable about a central axis $A_C$. The inner ring assembly 10 basically comprises a bearing annular body 12 disposable about the shaft 4 and an annular locking collar 14 disposable about a portion of the annular body 12 and configured to retain the body 12 radially and axially on the shaft 4. With such an integral mounting structure, the bearing inner ring assembly 10 is readily mountable upon the shaft 4 without requiring precision machining of the shaft outer surface 4a.

More specifically, the annular body 12 has a centerline 13, opposing first and second axial ends 12a, 12b, an inner circumferential surface 16 defining a central bore 17 for receiving the shaft 4 and an opposing outer circumferential surface 18. An annular groove 20 extends inwardly from the outer surface 18 and provides a bearing inner race 22 for receiving the rolling elements 3. A plurality of slotted openings 24 extend axially inwardly from the first axial end 12a of the annular body 12 and are spaced circumferentially about the centerline 13 so as to define a plurality of arcuate mounting tabs 26. Each mounting tab 26 has an inner end 26a integral with a remainder of the annular body 12 and an opposing, free outer end 26b at the body first axial end 12a.

Figure 3:
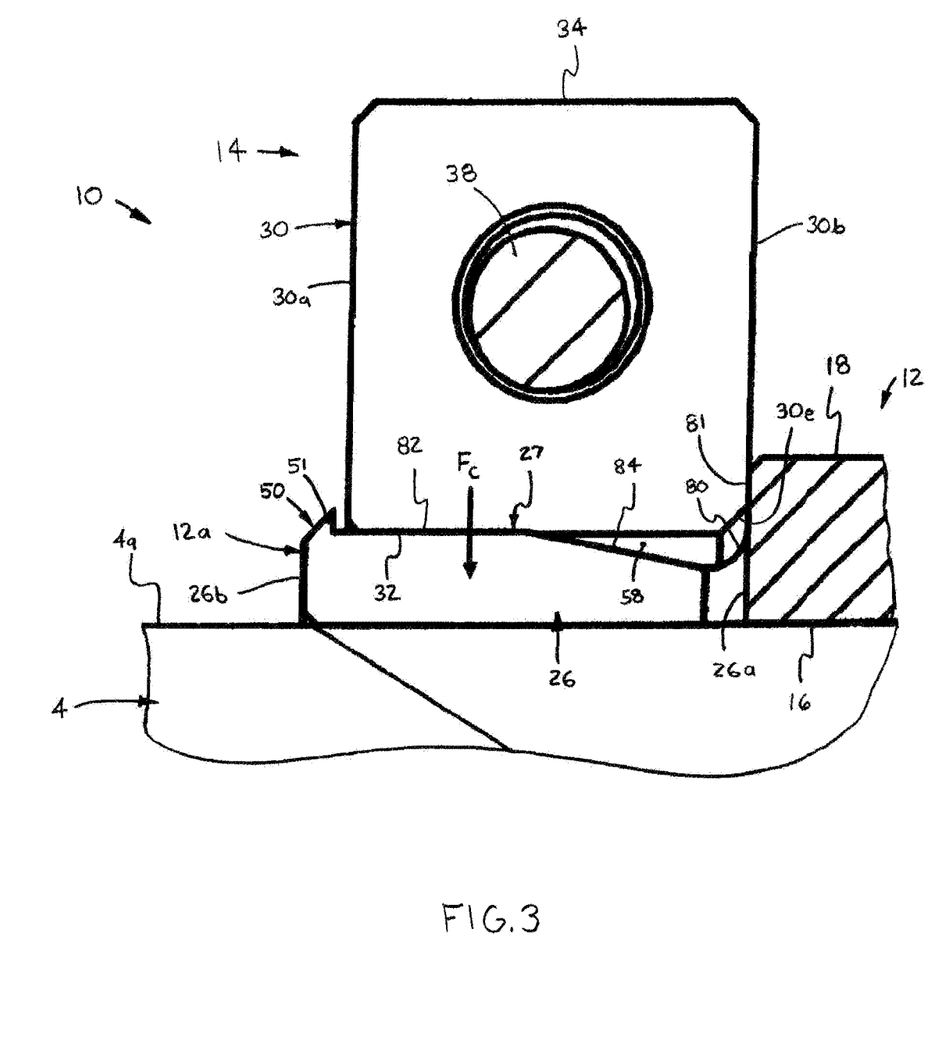
FIG. 3 is an enlarged, broken-away view of a portion of FIG. 2.
Figure 4:
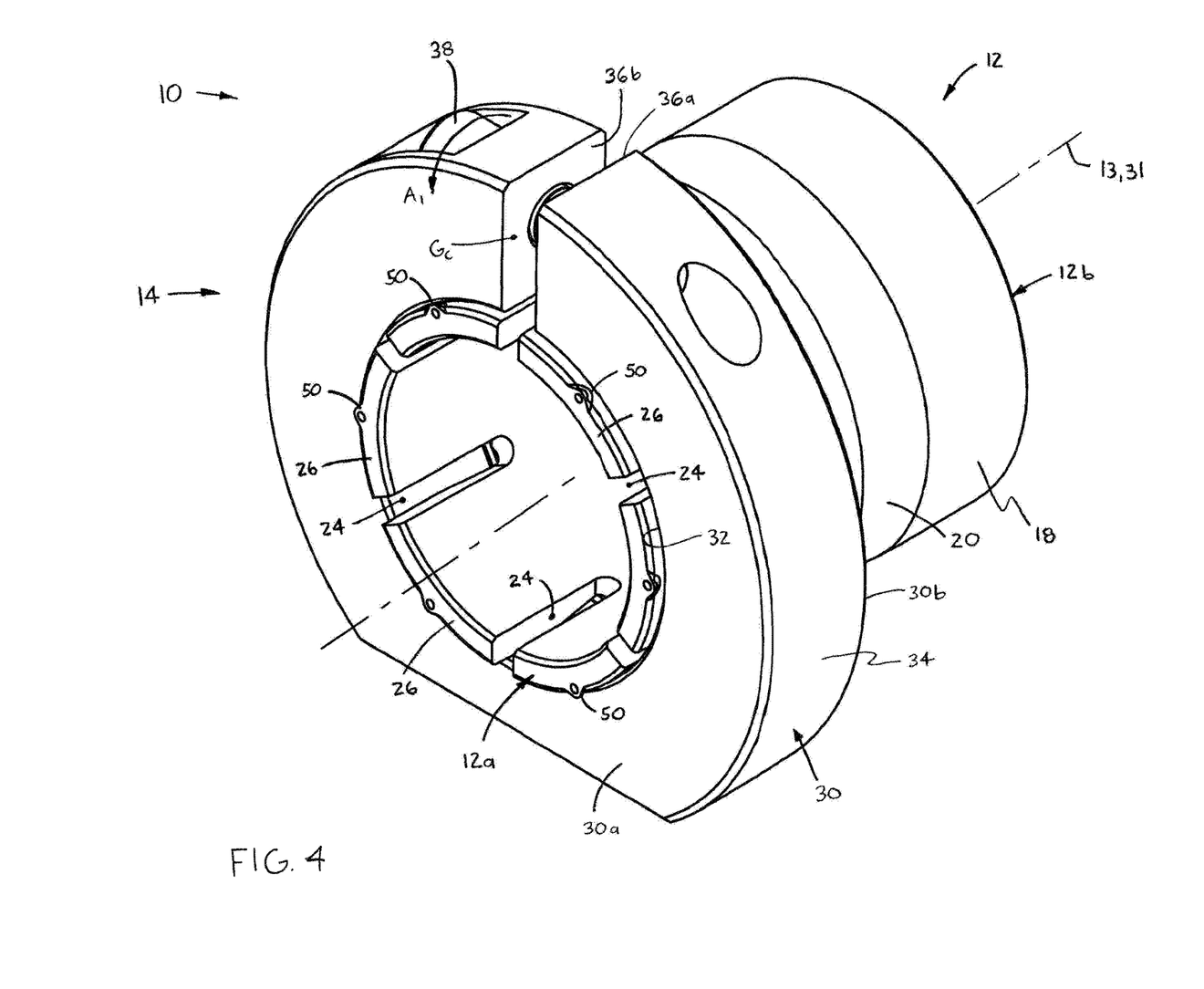
FIG. 4 is a perspective view of the inner ring assembly.

Further, the annular locking collar 14 is disposed about the plurality of mounting tabs 26 and is configured to clamp the tabs 26 against the outer surface 4a of the shaft 4, as depicted in FIGS. 2 and 3. Such clamping of the mounting tabs 26 retains the inner ring annular body 12 radially and axially with respect to the shaft central axis $A_C$. The locking collar 14 preferably includes an annular body 30 having a centerline 31, first and second axial ends 30a, 30b, respectively, an inner circumferential surface 32 with an inside diameter $ID_C$ and an outer circumferential surface 34. The collar annular body 30 has a gap $G_C$ defining first and second spaced apart circumferential ends 36a, 36b, respectively, i.e., the gap $G_C$ extends both axially between the first and second axial ends 30a, 30b and radially between the inner and outer circumferential surfaces 32, 34 to form the circumferentially spaced or "circumferential" ends 36a, 36b. Preferably, the annular body 30 has an inside diameter $ID_C$ in an unbended state, i.e., prior to clamping on the tabs 26, being sized such that the collar 14 is assembled about the plurality of mounting tabs 26 with a "line to line fit", as is well known in engineering tolerancing, for reasons discussed below.

Figure 9:
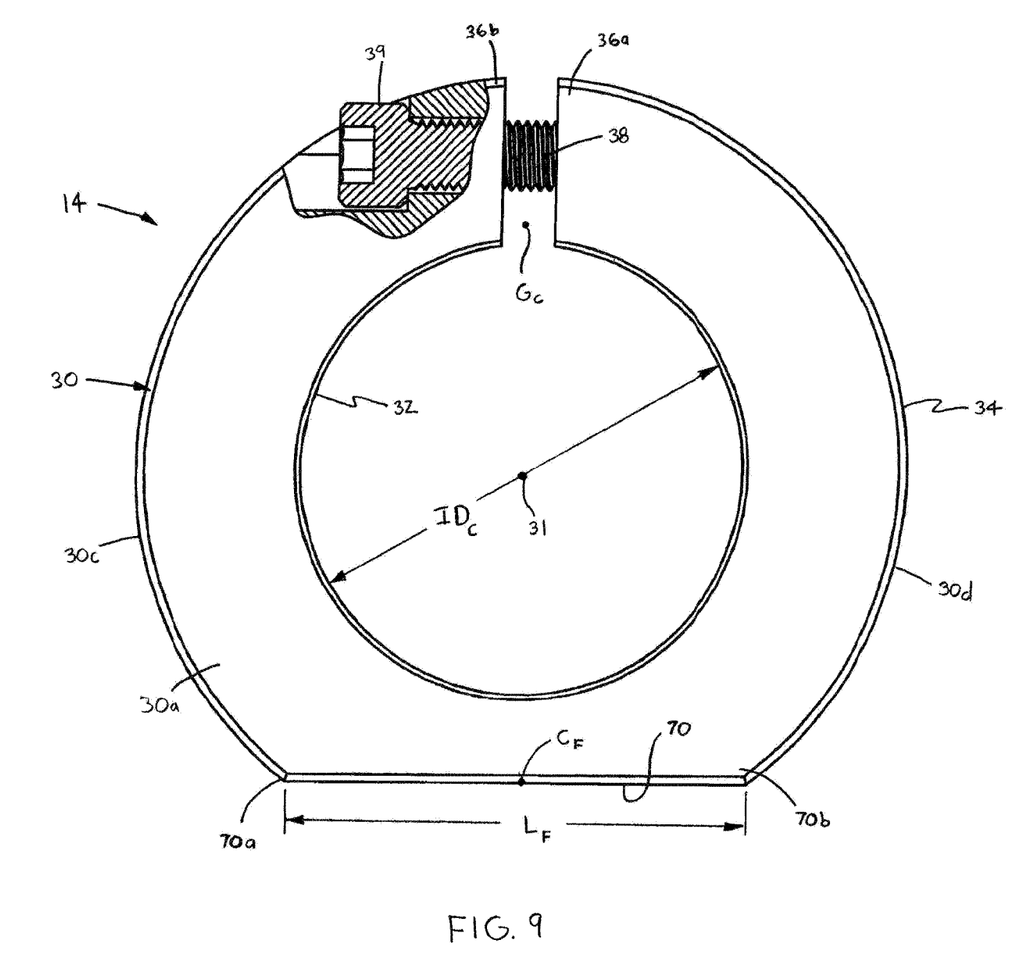
FIG. 9 is a partially broken-away front plan view of the locking collar.
Figure 10:
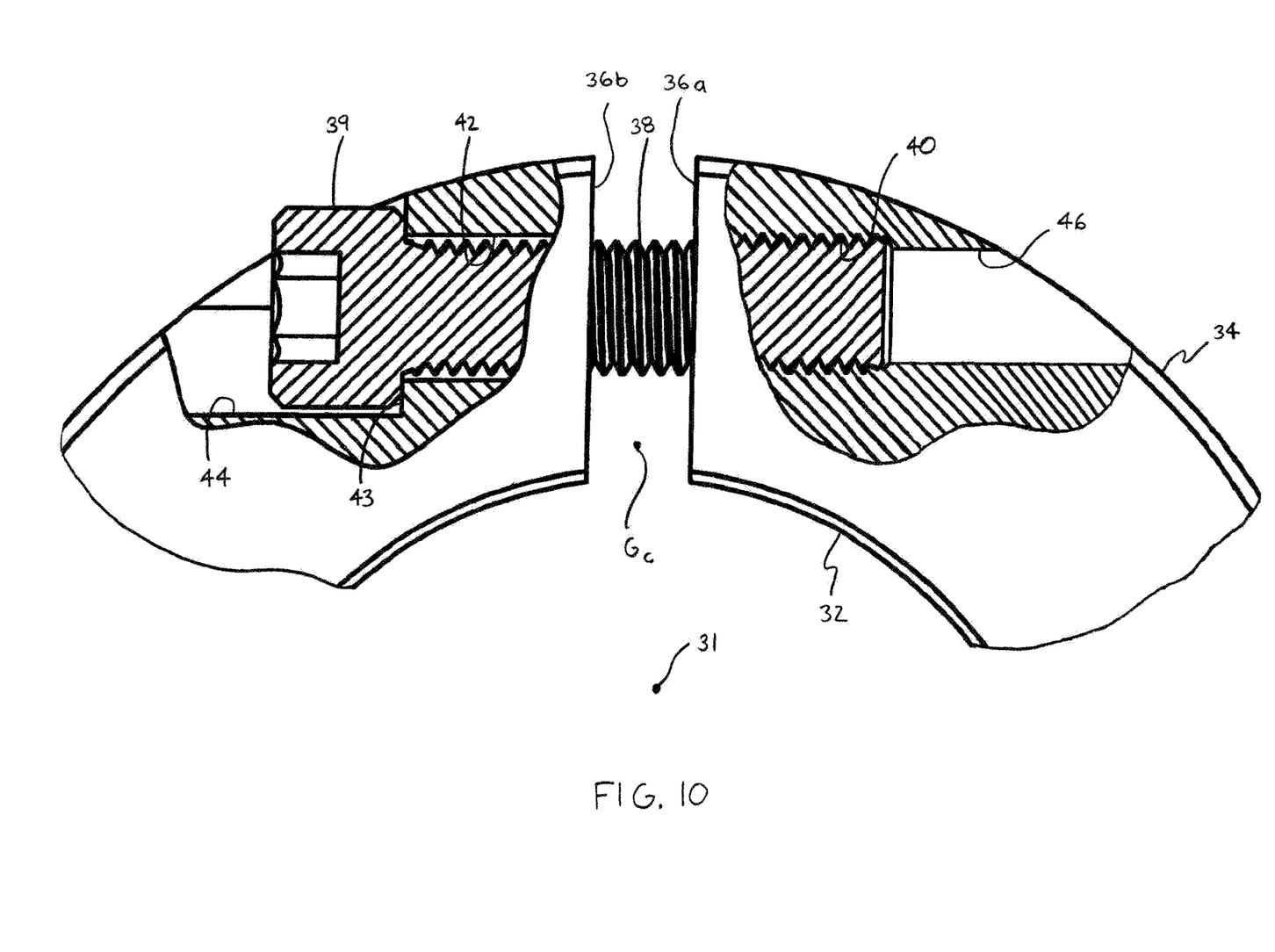
FIG. 10 is an enlarged, broken-away view of an upper portion of FIG. 9.

Furthermore, a threaded rod 38 extends through the first and second circumferential ends 36a, 36b and the collar 14 is configured such that rotation of the rod "closes" the gap $G_C$ and clamps the collar 14 about the mounting tabs 26, i.e., with a clamping force $F_C$ (FIG. 3). Specifically, a threaded opening 40 is formed in the first circumferential end 36a and a through hole 42 is formed in the second circumferential end 36b, the opening 40 and the hole 42 being generally aligned and extending generally tangentially with respect to the collar centerline 31, as best shown in FIG. 10. The threaded rod 38 extends through the through-hole 42 and into the threaded opening 40 and has a head 39 that bears against a shoulder surface 43 surrounding the hole 42. With this structure, rotation of the rod 38 in a first angular direction $A_1$ (FIG. 4) displaces the first and second ends 36a, 36b of the annular body 36 generally toward each other, which reduces the size of the body inside diameter $ID_C$ (FIG. 9). Such reduction of the collar body inside diameter $ID_C$ causes the collar 14 to compress or clamp the plurality of mounting tabs 26 into engagement with the shaft 4, as indicated in FIG. 3. Further, the threaded opening 40 and the through hole 42 are arranged such that torque applied to rotate the rod 38 in the first direction $A_1$ tends to bias a lower portion of the collar annular body 30 inwardly toward a center $C_B$ of the annular body 12 and against a lower portion of a radial stop surface 81 of the body 12, which facilitates installation of the inner ring assembly 10 on the shaft 4.

With the basic structure being described above, the present inner ring assembly 10 has a number of improvements over previously known inner ring assemblies, such as follows. The locking ring assembly 10 is provided with at least one, and preferably two, structural features for retaining the locking collar 14 on the inner ring body 12 when the inner ring assembly 10 is separate from the shaft 4, i.e., during transport and prior to assembly. Also, the locking collar 14 is formed so as to more evenly distribute the mass of the collar body 30 about the centerline 31 and thereby optimize dynamic balance of the inner ring assembly 10, and to also increase the clamping force exerted on the mounting tabs 26. Further, the annular body 12 of the ring assembly 10 is formed to reduce stress concentration, particularly by improvements in the structure of the mounting tabs 26. These improvements and others of the present inner ring assembly 10 are explained in greater detail below.

Referring to FIGS. 3-6 and 11-12, as mentioned above, the inner ring assembly 10 preferably has two structural features for retaining the locking collar 14 disposed about the inner ring body 30 when the inner ring assembly 10 is separate from the shaft 4, i.e., when the ring assembly 10 is in an unmounted or "dismounted" state. First, at least one and preferably all of the mounting tabs 26 each has a projection 50 extending radially outwardly from the outer axial end 26b of each tab 26. Each projection 50 is disposable against or engageable with the locking collar 14 to retain the collar 14 on the inner ring assembly 10. More specifically, each retainer projection 50 is sized to permit the collar 14 to displace axially over the plurality of projections 50 during installation of the collar 14 on the inner ring body 12, unless the projections 50 are formed after installation of the collar 14 about the annular body 12, as discussed below. That is, each projection 50 has a limited radial height or extent such that, with slight inward bending of the mounting tabs 26 and angling or cocking of the collar body 30, the inner surface 32 of the collar 14 is able to pass over all of the projections 50 to become disposed about the plurality of mounting tabs 26.

Figure 5:
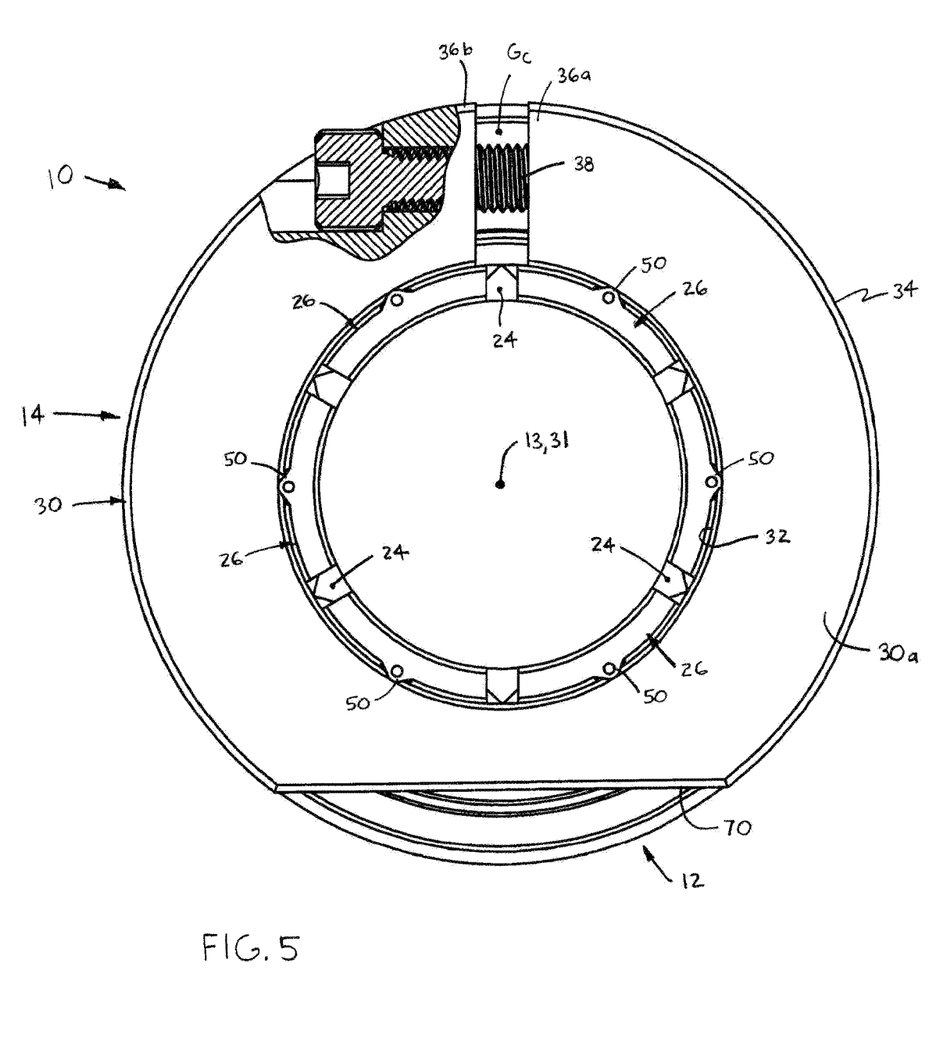
FIG. 5 is a front plan view of the inner ring assembly.
Figure 6:
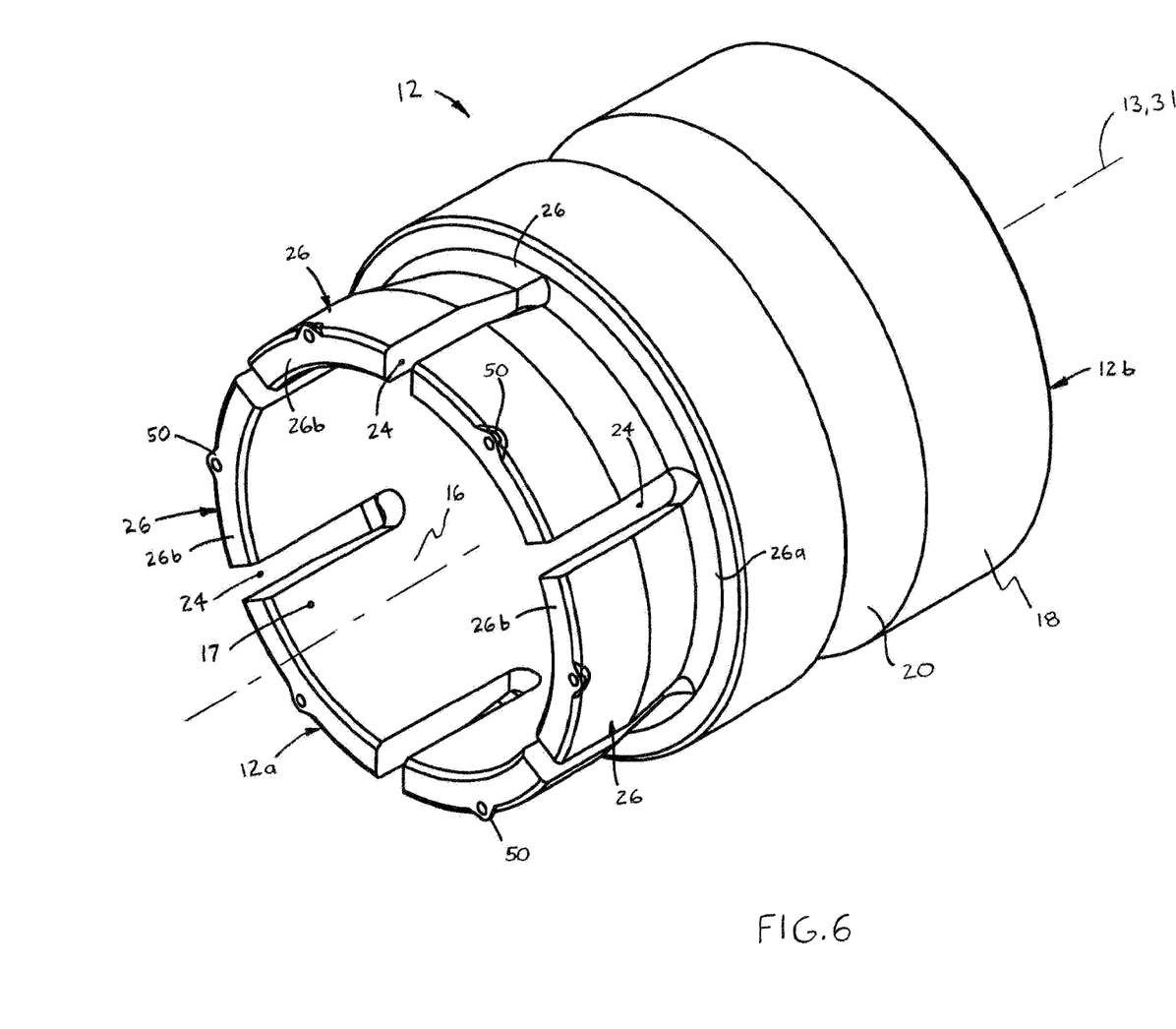
FIG. 6 is perspective view of a bearing annular body of the inner ring assembly.
Figure 7:
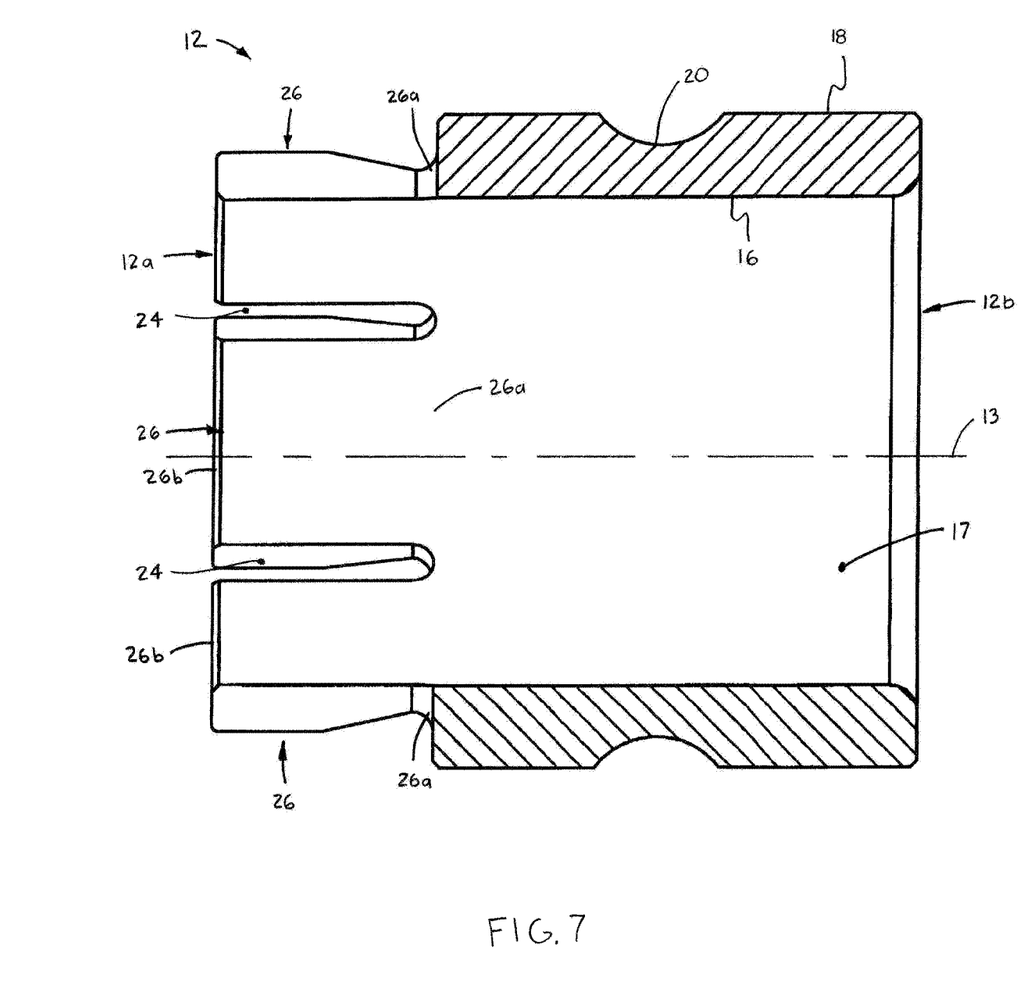
FIG. 7 is an axial cross-sectional view of the bearing annular body.
Figure 8:
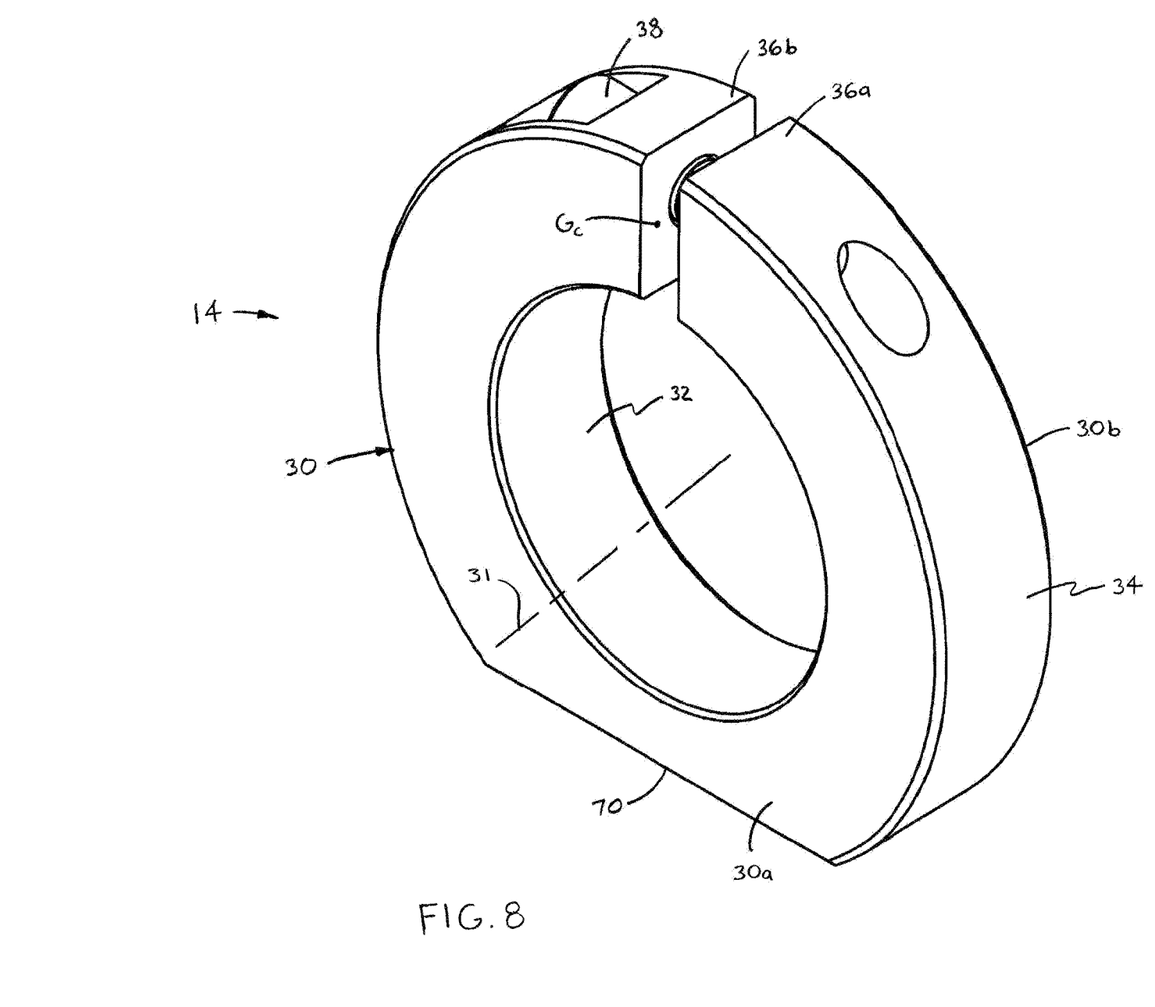
FIG. 8 is a perspective view of a locking collar of the inner ring assembly.

At the same time, each projection 50 is also sized to engage with the first or outer axial end 30a of the collar annular body 30 to retain the locking collar 14 on the ring annular body 12. In other words, the projections 50 have a sufficient radial length/height to collectively retain the locking collar 14 from being axially displaced off of the mounting tabs 26 once installed thereabout. However, the radial height/length of each projection 50 is preferably lesser than the radial height of a chamfer 30e formed on the inner end 30b of the collar annular body 30 to enable the collar 14 to deflect the mounting tabs 26 radially inwardly during assembly of the collar 14. Further, each projection 50 may be pre-formed as a forged or machined projection or may be formed after assembly of the collar 14 onto the mounting tabs 26, such as by staking or otherwise disrupting a portion of the material of each tab 26. Preferably, each projection 50 is generally pyramidal-shaped and located generally centrally on each mounting tab outer end 26b, as best shown in FIG. 5. Alternatively, each projection 50 may be provided by an arcuate radial lip 51 formed at the outer end 26a of each mounting tab 26, as depicted in FIG. 3. However, the retainer projections 50 may have any other appropriate shape or the inner ring assembly 10 may be formed without any retainer projections, such that the locking collar 14 is retained solely by a movable retainer member 56, as follows.

Figure 11:
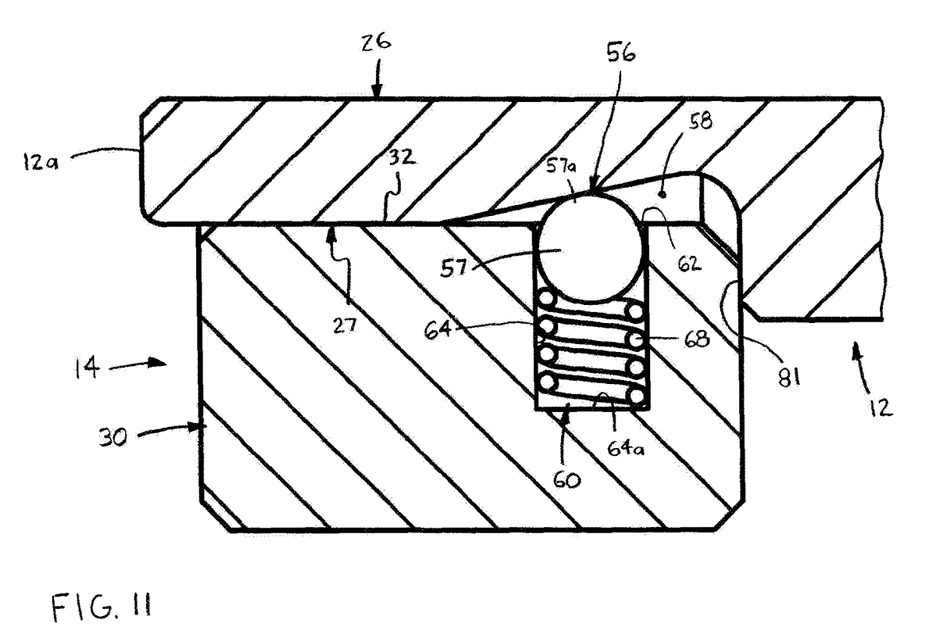
FIG. 11 is a broken-away, axial cross-sectional view of a lower portion of the locking collar, showing a first construction retainer.
Figure 12:
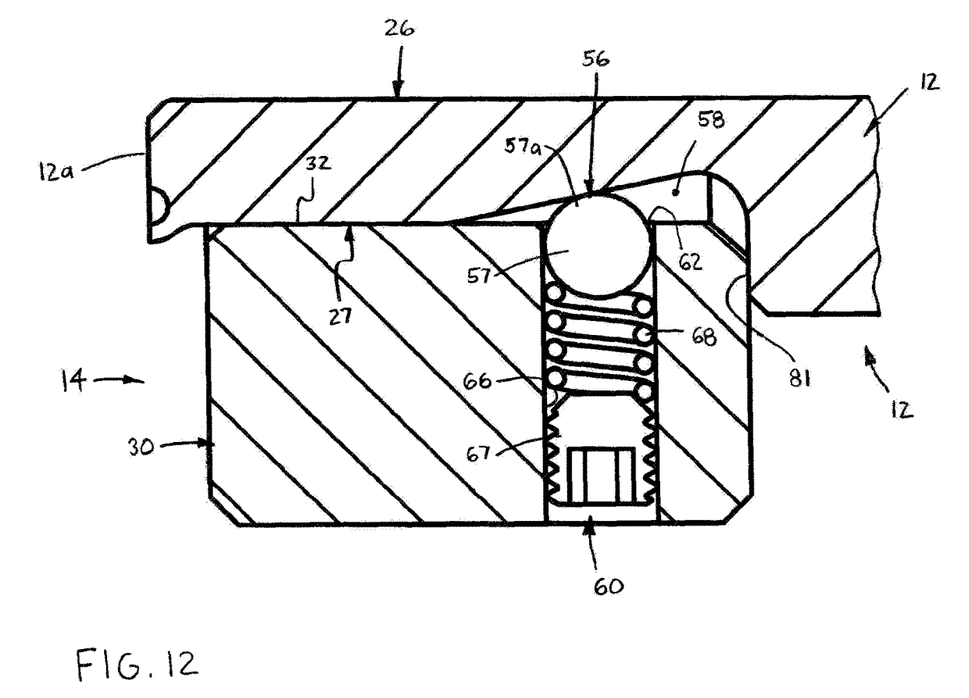
FIG. 12 is a broken-away, axial cross-sectional view of a lower portion of the locking collar, showing a second construction retainer.

Referring to FIGS. 11-12, the inner ring assembly 10 may additionally or alternatively include a retainer member 56 movably coupled with and projecting radially inwardly from the locking collar 14. The retainer member 56 is engaged or engageable with one of the mounting tabs 26, preferably with a recess 58 of one of the mounting tabs 26, to thereby retain the locking collar 14 disposed about the ring annular body 12. More specifically, each one of the mounting tabs 26 of the inner ring annular body 12 has an outer surface 27 with a recess 58, as described in detail below, and the retainer member 56 extends radially inwardly from the inner circumferential surface 32 of the collar body 30. The retainer member 56 has an inner radial end 56a disposable within the recess 58 of one of the mounting tabs 26 to retain the locking collar 14 on the ring annular body 12.

Preferably, the locking collar 14 has a radial passage 60 with an opening 62 on the collar inner circumferential surface 32, which may be a blind hole 64, as shown in FIG. 11, or a through hole 66 as depicted in FIG. 12. The retainer member 56 is disposed within the passage 60 and extends through the passage opening 62. Further, a spring 68 is disposed within the passage 60 and biases the retainer member 56 radially inwardly toward the one mounting tab 26, i.e., the mounting tab 26 which is located so as to extend beneath the passage 60.

The retainer member 56 is preferably a sphere or "ball" 57 having a radially inner portion 57a disposed externally of the collar 14 and within the mounting tab recess 58. The spring 64 is compressed between the ball 57 and either an inner end 64a of the blind hole 64 or a threaded rod 67 enclosing the through hole 66. Although preferably formed as a ball 57, the retainer member 56 may be formed in any other appropriate manner, such as for example, as a stepped pin (not shown) slidably disposed within the passage 60. Furthermore, the locking collar 14 may alternatively be formed without any movable retainer member and may instead be retained on the inner ring body 12 solely by the projections 50 on the mounting tabs 26.

Referring now to FIGS. 9 and 10, as described above, the locking member 14 is preferably formed with the annular body 30 having an adjustable gap $G_C$, the threaded opening 40 and the through hole 42. To provide the shoulder surface 43 and space for the rod head 39, a counterbore hole 44 is also formed adjacent to the through hole 42 and a partial "lead in" opening 46 is formed adjacent to the threaded opening 40 during drilling of the opening 40 prior to tapping the threads thereof. As such, the gap $G_C$, the threaded opening 40 and the holes 42, 44, 46 each reduce the mass or weight of the collar body 30 in a section of the body 30 generally centered about the gap $G_C$, which is not compensated for by the mass of the threaded rod 38. As such, the center of mass (not indicated) of the locking collar 14 is offset from the centerline 31 of the collar body 30, and therefore from the shaft central axis $A_C$. Thus, the inner ring assembly 10 is dynamically imbalanced during rotation of the shaft 4, which may result in vibration or excess stresses or strains within portions of the inner ring assembly 10.

Therefore, to improve the dynamic characteristics of the present inner ring assembly 10, the annular body 30 of the locking collar 14 is preferably formed having a flat surface section 70 in the body outer circumferential surface 34. Such a flat surface section 70 is formed by removal of a circular segment from a solid annular body 30 and has a center $C_F$ and a length $L_F$ between opposing ends 70a, 70b, as indicated in FIG. 9. The center $C_F$ of the flat surface section 70 is spaced about one hundred eighty degrees (180°) from the collar gap $G_C$, so as to be located to offset the material losses or mass reduction in region of the gap $G_C$. Further, the length $L_F$ of the flat surface 70 is selected so as to remove a sufficient amount of material from the annular body 30 to offset the material removed in the region of the gap $G_C$ so that the center of mass (not indicated) of the body 30 with the flat surface 70 is generally located on the centerline 31. As such, the flat 70 functions to increase the dynamic balance the locking collar 14 about the shaft central axis $A_C$.

Furthermore, by forming the annular body 30 of the collar 14 with the flat surface section 70, the flexibility of the locking collar 14 is increased during compression of the mounting tabs 26. Specifically, providing the flat surface section 70 forms two arcuate portions 30c, 30d of the collar annular body 30 which each extend between one end 70a, 70b, respectively, of the flat section 70 and a separate one of the circumferential ends 36a, 36b, respectively, of the body 30. These arcuate portions 30c, 30d of the annular body 30 tend to pivot about the ends 70a, 70b of the flat section 70 and toward the collar centerline 31 when the threaded rod 38 displaces the circumferential ends 36a, 36b toward each other, which increases the clamping force $F_C$ exerted by the annular body 30 on the mounting tabs 26. Also, due to the line to line fit between the inner circumferential surface 32 of the collar 14 and the outer surfaces 27 of the mounting tabs 26, the amount of rotation of the threaded rod 38 necessary to clamp the mounting tabs 26 to the shaft 4 is reduced and the total amount of clamping force $F_C$ exerted on the tabs 26 is potentially increased.

Figure 13:
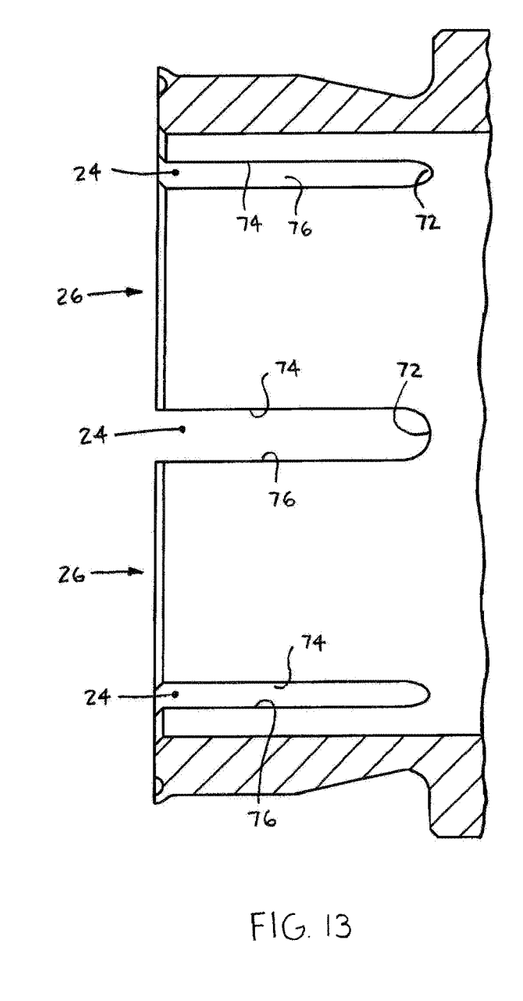
FIG. 13 is broken-away, axial cross-sectional view of the bearing annular body, showing a first construction slotted opening.
Figure 14:
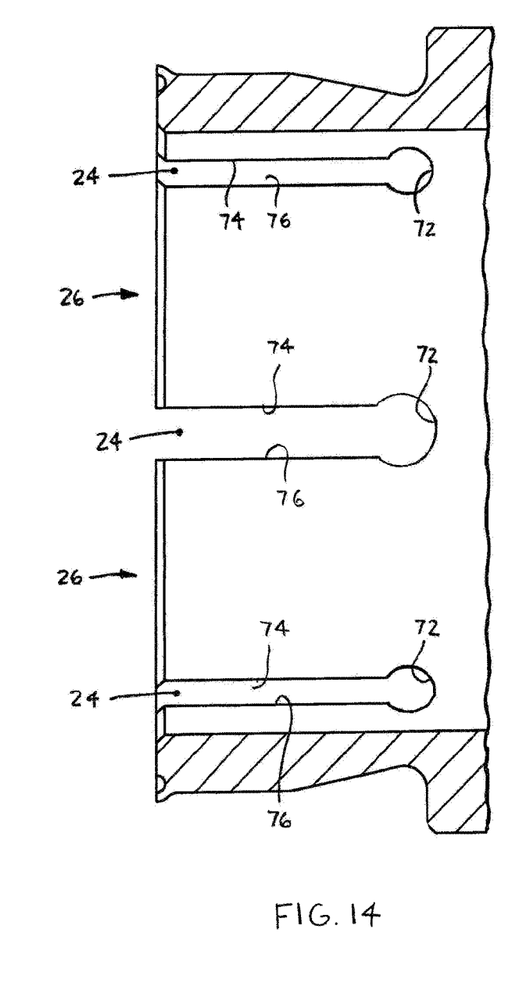
FIG. 14 is broken-away, axial cross-sectional view of the bearing annular body, showing a second construction slotted opening.
Figure 15:
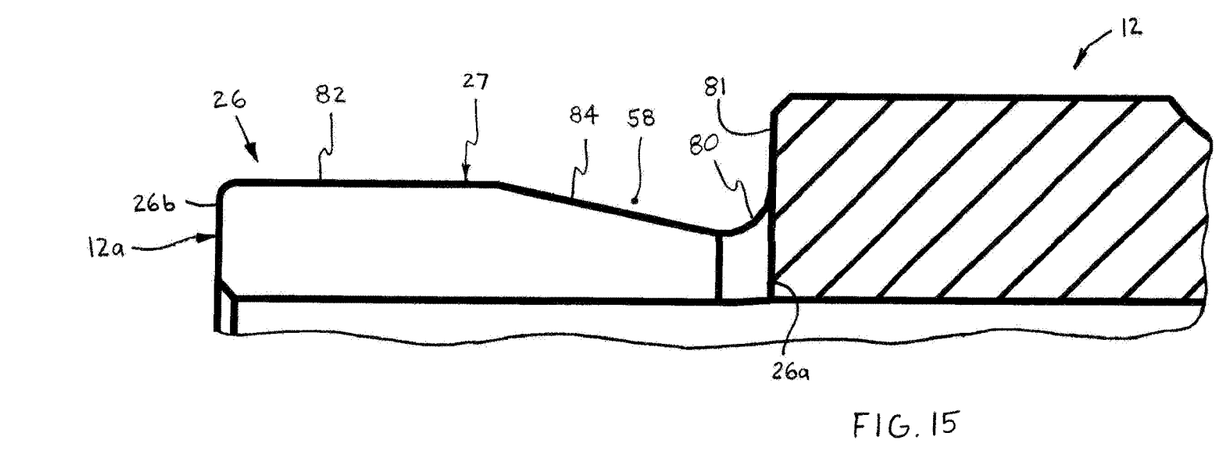
FIG. 15 is an enlarged, broken-away axial view of a mounting tab.

Referring to FIGS. 3 and 13-16, as mentioned above, the bearing annular body 12 of the inner ring assembly 10, and particularly the mounting tabs 26 thereof, are preferably formed so as to reduce stress concentration and therefore fracturing or other forms of failure of the assembly 10. First, each one of the slotted openings 24 in the annular body 12 is preferably partially bounded by a curved inner end surface 72, which are each adjacent to the bendable inner ends 26a of two mounting tabs 26. Specifically, each slotted opening 24 is defined by facing first and second side surfaces 74, 76, each side surface 74, 76 extending axially inwardly from the annular body first axial end 12a, and the curved end surface 72 extends between and connects the inner ends 74a, 76a of the first and second side surfaces 74, 76. Typically, such slotted openings have a "flat" end surface which extends perpendicular to the side surfaces and creates corners, which lead to a concentration of stress during bending of the adjacent tabs. Preferably, the curved end surfaces 72 are partially circular as shown in FIGS. 13 and 14, and may extend circumferentially wider than the spacing between the side surfaces 74, 76, as depicted in FIG. 14. However, each curved end surface 72 may have any other appropriate shape, such as partially elliptical, etc.

Next, each one of the mounting tabs 26 is preferably formed having an outer circumferential surface 27 with a radiused section 80 at the tab inner end 26a, a cylindrical section 82 extending axially inwardly from the tab outer end 26b and an angled section 84 extending between the radiused section 80 and the cylindrical section 82. The radiused section 80 and the angled section 82 define the tab recess 58 for receiving the collar retainer member 56, as described above, the recess 58 having an innermost point PI that is offset radially inwardly from the cylindrical section 84 by an offset distance $d_O$ (FIG. 16) as discussed below. With this mounting tab structure, the inner surface 32 of the locking collar 14 is disposed against and about the cylindrical surfaces 82 of all of the mounting tabs 26, with the second, inner end 30b of the collar body 30 preferably being disposed against a radial stop surface 81 of the annular body 12 formed radially outwardly of the recessed surface section 80, as shown in FIG. 3.

Figure 16:
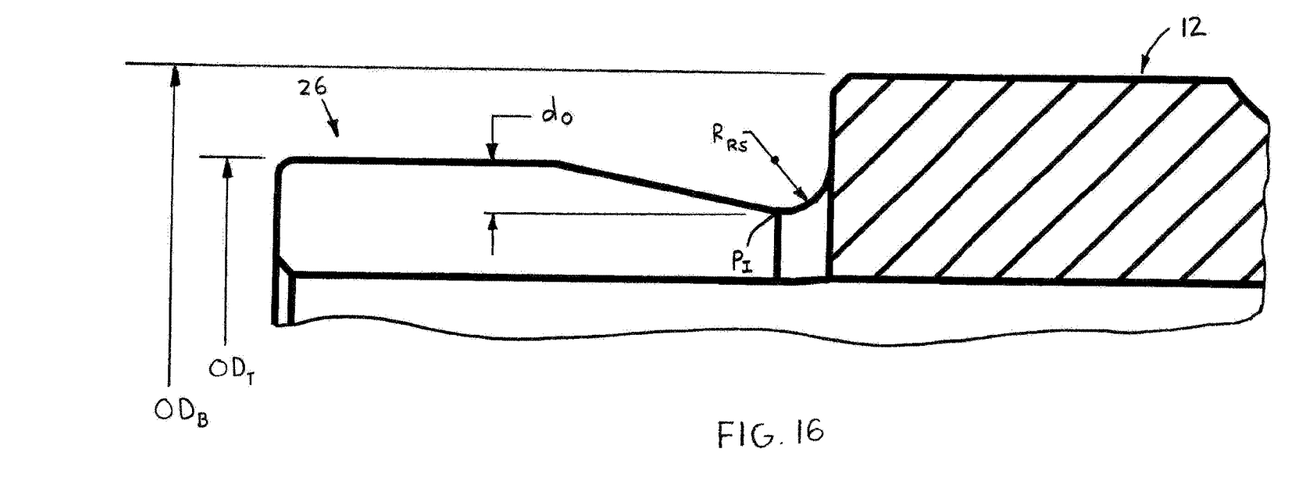
FIG. 16 is another enlarged, broken-away axial view of a mounting tab.

Thus, the material reduction created by forming the radiused and angled sections 80, 84, respectively, increases the flexibility of the mounting tabs 26. As such, each mounting tab 26 is radially bendable at the radiused section 80 with respect to the remainder of the ring annular body 12 generally in the manner of a cantilever beam, thereby enabling the mounting tabs 26 to deflect inwardly during clamping by the locking collar 14. To further increase the flexibility of the mounting tabs 26, each tab cylindrical section 82 has an outside diameter $OD_T$ that is lesser than the outside diameter $OD_B$ of the remainder of the ring annular body 12, as shown in FIG. 16.

To reduce stress concentration at the inner end 26a of each mounting tab 26, the radiused section 80 is preferably formed having a substantial radius $R_{RS}$ that extends between the remainder of the bearing annular body 12 and the angled section without any joints or disruptions which could concentrate stresses. Preferably, the radius $R_{RS}$ is at least about half of the offset distance $d_O$ of the recess 58, and most preferably about equal to the offset distance $d_O$, as depicted in FIG. 16. Further, the transition between the angled surface section 84 and the cylindrical surface section 82 eliminates a sharp edge or shoulder between the recess 58 and the tab surface 82 receiving clamping force $F_C$ from the locking collar 14. Therefore, with both the substantial radius $R_{RS}$ of the radiused section 80 and an angled surface section 84 which transitions to the cylindrical surface section 82 without any sharp edges, the stress concentrations within each mounting tab 26 are generally eliminated or at least significantly reduced.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. An inner ring assembly for a bearing, the bearing rotatably coupling a shaft with an outer member, the shaft being rotatable about a central axis, the inner ring assembly comprising:

a ring annular body disposable about the shaft and having a centerline, opposing first and second axial ends, an outer circumferential surface, an annular groove extending radially inwardly from the outer surface and providing a bearing inner race, and a plurality of slotted openings extending axially inwardly from the first axial end and spaced circumferentially about the centerline so as to define a plurality of arcuate mounting tabs, each mounting tab having an inner end integral with a remainder of the annular body and an opposing, free outer end; and an annular locking collar disposed about the plurality of mounting tabs and configured to clamp the tabs against the outer surface of the shaft so as to retain the inner ring radially and axially with respect to the shaft central axis, the collar being retained on the ring annular body when the inner ring is separate from the shaft by at least one of a retainer projection extending radially outwardly from the outer end of one of the mounting tabs and engaging with the collar and a retainer member movably coupled with and projecting radially inwardly from the collar and engaging with one of the mounting tabs.

2. The inner ring assembly as recited in claim 1 wherein:
   each one of the mounting tabs of the ring annular body has an outer surface with a recess; and
   the locking collar has an inner circumferential surface and the retainer member extends radially inwardly from the collar inner circumferential surface, the retainer member having an inner radial end disposable within the recess of one of the mounting tabs to retain the collar on the annular body.

3. The inner ring assembly as recited in claim 2 wherein the locking collar has a radial passage with an opening on the inner circumferential surface, the retainer member being disposed within the passage and extending through the passage opening, and a spring disposed within the passage and biasing the member radially inwardly toward the one mounting tab.

4. The inner ring assembly as recited in claim 1 wherein each one of the mounting tabs has the retainer projection extending radially outwardly from the tab outer axial end and the retainer projection is sized to permit the collar to displace axially over the projection during installation of the collar on the inner ring body and sized to engage with an axial end of the collar to retain the collar on the inner ring.

5. The inner ring assembly as recited in claim 1 wherein each one of the mounting tabs has an outer circumferential surface with a radiused section at the tab inner end, a cylindrical section extending axially inwardly from the tab outer end and an angled section extending between the surface radiused section and the surface cylindrical section, the radiused section and the angled section defining a recess, each mounting tab being generally radially bendable at the radiused section with respect to the remainder of the ring annular body.

6. The inner ring assembly as recited in claim 5 wherein an innermost point of the recess is offset radially inwardly from the cylindrical section by an offset distance and the radiused section has a radius of at least half of the offset distance.

7. The inner ring assembly as recited in claim 1 wherein each slotted opening of the inner ring body has opposing, first and second side surfaces, each side surface extending axially between an outer end at the annular body outer end and an inner end, and a curved end surface extending between the inner ends of the first and second side surfaces.

8. The inner ring assembly as recited in claim 1 wherein the locking collar includes an annular body with a gap defining first and second spaced apart circumferential ends, a threaded opening formed in the first circumferential end, a through hole formed in the second circumferential end and a threaded rod extending through the through-hole and into the threaded opening such that rotation of the rod in a first angular direction displaces the annular body first and second ends generally toward each other to reduce the annular body inside diameter and compress the plurality of mounting tabs into engagement with the shaft.

9. The inner ring assembly as recited in claim 8 wherein the annular body of the locking collar has an outer circumferential surface with a flat surface section, the flat surface section having a center spaced about one hundred eighty degrees from the gap so as to increase the dynamic balance the collar about the shaft central axis.

10. An inner ring assembly for a bearing, the bearing assembly rotatably coupling a shaft with an outer member, the shaft being rotatable about a central axis, the inner ring assembly comprising:
   a ring annular body disposable about the shaft and having a centerline, opposing first and second axial ends, an outer circumferential surface, an annular groove extending inwardly from the outer surface and providing a bearing inner race, and a plurality of slotted openings extending axially inwardly from the first axial end and spaced circumferentially about the centerline so as to define a plurality of arcuate mounting tabs, each mounting tab having an inner end integral with a remainder of the annular body and an opposing, free outer end; and
   a locking collar including an annular body disposed about the plurality of mounting tabs, the annular body having an inner circumferential surface with an inside diameter, an outer circumferential surface, a gap defining spaced apart first and second circumferential ends, and a threaded rod extending through the first and second circumferential ends such that rotation of the threaded rod in a first angular direction displaces the first and second circumferential ends generally toward each other to reduce the body inside diameter and compress the plurality of mounting tabs into engagement with the shaft, the body outer circumferential surface having a flat surface section with a center spaced about one hundred eighty degrees (180°) about the centerline from the gap so as to increase the dynamic balance of the collar about the shaft central axis and increase the flexibility of the annular body during compression of the mounting tabs.

11. The inner ring assembly as recited in claim 10 wherein a threaded opening is formed in the first circumferential end of the collar annular body, a through hole is formed in the second circumferential end of the collar annular body and the threaded rod extends through the through-hole and into the threaded opening, the threaded opening being oriented such that torque applied to rotate the rod in the first angular direction biases the locking collar axially toward the center of the ring annular body.

12. The inner ring assembly as recited in claim 10 wherein the collar is retained on the ring annular body when the inner ring is separate from the shaft by at least one of a retainer projection extending radially outwardly from the outer end of one of the mounting tabs and engaging with the collar and a retainer member movably coupled with and projecting radially inwardly from the collar and engaging with one of the mounting tabs.

13. The inner ring assembly as recited in claim 12 wherein at least one of:
   each one of the mounting tabs of the ring annular body has an outer surface with a recess, the locking collar has an inner circumferential surface and the retainer member extends radially inwardly from the collar inner circumferential surface, the retainer member having an inner radial end disposable within the recess of one of the mounting tabs to retain the collar on the annular body; and
   each one of the mounting tabs has the retainer projection extending radially outwardly from the tab outer axial end and each retainer projection is sized to permit the collar to displace axially over the projection during installation of the collar on the inner ring body and sized to engage with an axial end of the collar to retain the collar on the inner ring.

14. The inner ring assembly as recited in claim 10 wherein each one of the mounting tabs has an outer circumferential surface with a radiused section at the tab inner end, a cylindrical section extending axially inwardly from the tab outer end and an angled section extending between the surface radiused section and the surface cylindrical section, the radiused section and the angled section defining a recess, each mounting tab being generally radially bendable at the radiused section with respect to the remainder of the ring annular body.

15. The inner ring assembly as recited in claim 10 wherein the annular body of the collar has an inside diameter in an unbended state being sized such that the collar is assembled about the plurality of mounting tabs with a line to line fit.

16. An inner ring assembly for a bearing assembly, the bearing rotatably coupling a shaft with an outer member, the shaft being rotatable about a central axis, the inner ring assembly comprising:
 an annular body disposable about the shaft and having a centerline, opposing first and second axial ends, an outer circumferential surface, an annular groove extending inwardly from the outer surface and providing a bearing inner race, and a plurality of slotted openings extending axially inwardly from the first axial end and spaced circumferentially about the centerline so as to define a plurality of arcuate mounting tabs, each slotted opening being partially bounded by a curved inner end surface and each mounting tab having an inner axial end integral with a remainder of the annular body, a free, outer axial end and an outer circumferential surface, the outer surface of each tab having a radiused section at the tab inner end, a cylindrical section extending axially inwardly from the tab outer end and an angled section extending between the radiused section and the cylindrical section and defining a recess; and
 an annular locking collar disposed about the plurality of mounting tabs and configured to clamp the tabs against the outer surface of the shaft so as to retain the inner ring radially and axially with respect to the shaft central axis.

17. The inner ring assembly as recited in claim 16 wherein the curved surface section of each slotted opening is partially circular.

18. The inner ring assembly as recited in claim 16 wherein the locking collar has an inner circumferential surface and at least one retainer, the retainer extending radially inwardly from the collar inner surface and having an end portion disposable within the recessed section of one of the mounting tabs to retain the collar on the annular body.

19. The inner ring assembly as recited in claim 16 wherein at least one of:
 each one of the plurality of mounting tabs has a retainer projection extending radially outwardly from a center of the tab outer axial end and being sized to enable the collar to displace axially over the projection to install the collar on the inner ring body and to engage with an outer axial end of the collar to retain the collar on the inner ring; and
 the locking collar further includes a retainer member movably coupled with and projecting radially inwardly from the collar and engaging with one of the mounting tabs.

20. The inner ring assembly as recited in claim 16 wherein the locking collar includes an annular body disposed about the plurality of mounting tabs, the annular body having an inner circumferential surface with an inside diameter, an outer circumferential surface, a gap defining first and second spaced apart circumferential ends, and a threaded rod extending through the first and second circumferential ends such that rotation of the rod in a first angular direction displaces the first and second ends generally toward each other to reduce the annular body inside diameter and compress the plurality of mounting tabs into engagement with the shaft, the annular body outer circumferential surface having a flat surface section with a center spaced about one hundred eighty degrees (180°) about the centerline from the gap so as to increase the dynamic balance of the collar about the shaft central axis.

* * * * *